June 21, 1938.  L. HOFFMAN  2,121,400
CHAIN REPAIRING APPARATUS
Filed June 12, 1937  2 Sheets-Sheet 1
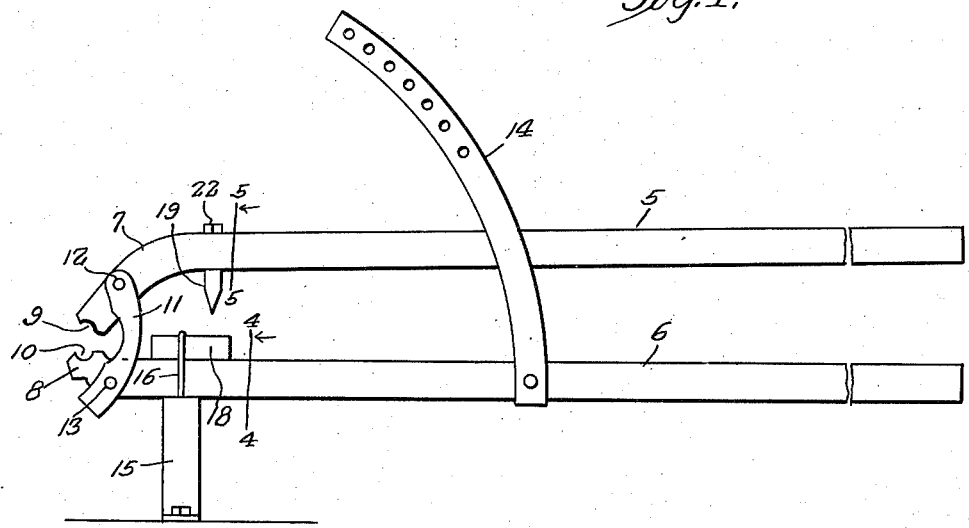
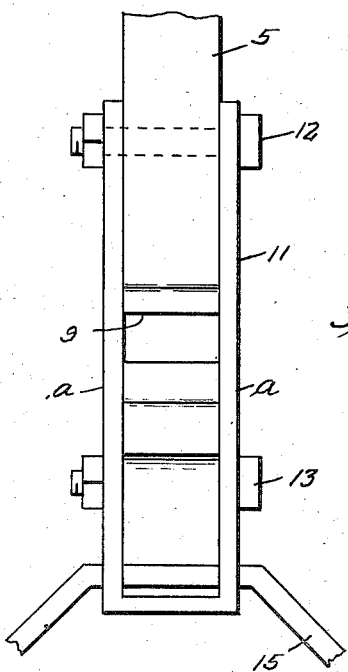
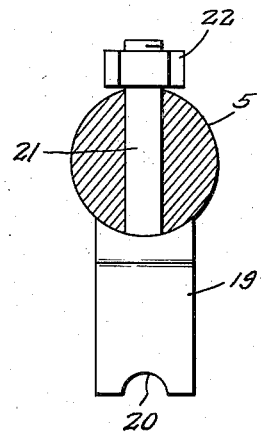
Inventor
Louis Hoffman,
By Clarence A. O'Brien
Hyman Berman
Attorneys

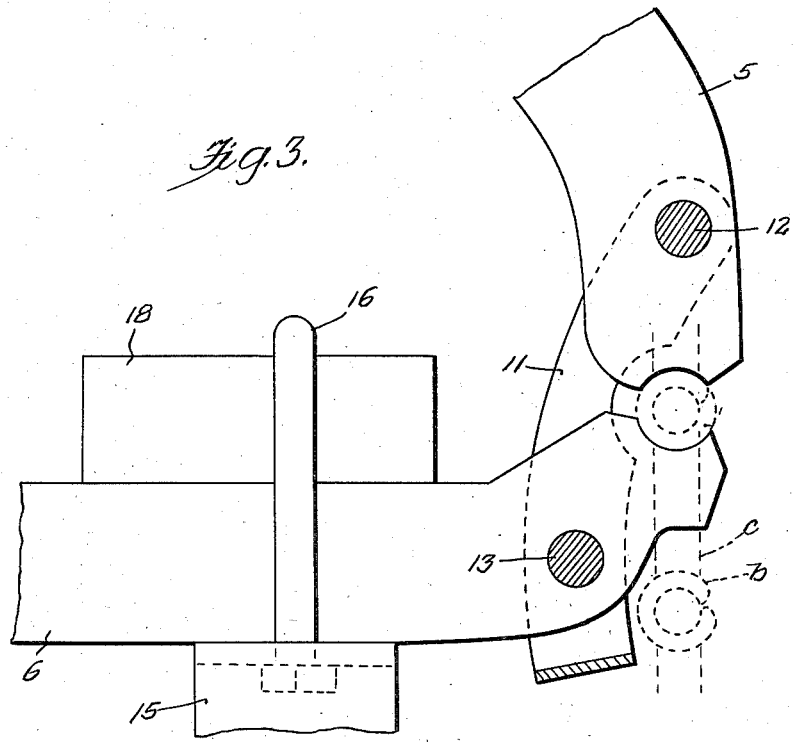
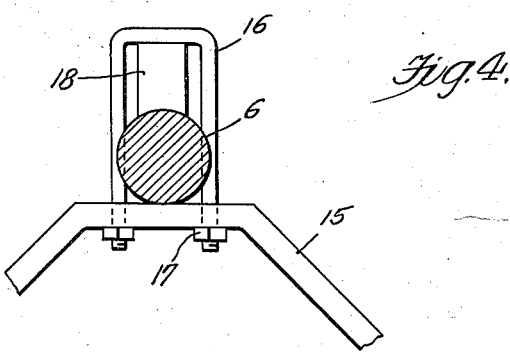
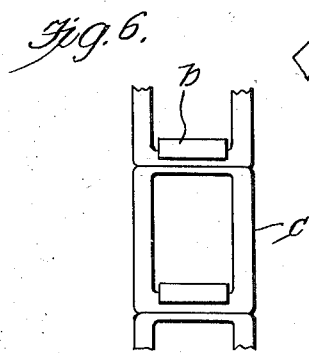

Patented June 21, 1938

2,121,400

UNITED STATES PATENT OFFICE 2,121,400

CHAIN REPAIRING APPARATUS

Louis Hoffman, Walla Walla, Wash.

Application June 12, 1937, Serial No. 147,961

1 Claim. (Cl. 81—15)

This invention appertains to new and useful improvements in means whereby chains can be repaired in a quick and convenient manner.

The principal object of the present invention is to provide a repair implement for chains of the type used on combines and other agricultural machines and elsewhere and in which hook elements are employed for hooking the links of the chain together.

Another important object is to provide a tool adapted to take up slack in chains of the character stated by closing the hook connections between the same, which connections have a tendency to accidentally open up and cause a slack in the chain after some use thereof.

Another important object of the invention is to provide a tool which can be easily manipulated to apply or remove the link hooks in a link-hook type chain without inconvenience.

These and various other important objects and advantages of the invention will become apparent to the reader of the following specification.

In the drawings:—

Figure 1 represents a side elevational view of the implement.

Figure 2 is a fragmentary front elevational view of the implement.

Figure 3 is a side elevational view with a portion in section.

Figure 4 is a fragmentary sectional view on the line 4—4 of Figure 1.

Figure 5 is a sectional view on the line 5—5 of Figure 1.

Figure 6 is a fragmentary plan view of the type of chain which can be repaired.

Referring to the drawings wherein like numerals designate like parts it can be seen that numerals 5—6 designate elongated handles, the handle 5 being curved downwardly as at 7, while the handle 6 at the end adjacent to the end 7 of the handle 5 is disposed upwardly as at 8. These converging portions 7—8 have opposed channeled jaw portions 9—10. A U-shaped yoke 11 has its leg portions a—a connecting the end portions 7—8 of the handle 5—6 respectively by bolts 12—13. Thus the yoke 11 serves as a link between the handles.

The arcuate-shaped guide 14 extends upwardly from the handle 6 and is preferably of arcuate-shape. The arm 5 rises against this guide and to limit upward movement of the arm 5, a pin or some other form of detent can be inserted into the openings at the upper portion of the guide 14 to stop the handle 5 in its upward movement.

A support 15 of substantially inverted U-shape has the handle 6 resting upon the bight portion thereof and a U-clamp 16 has its threaded end portion disposed through the bight portion of the support 15 and equipped with nuts 17. This U-clamp 16 encompasses the handle 6 and also the anvil block 18, which anvil block 18 underlies the wedge-shaped member 19 carried by the handle 5. This wedge-shaped member 19 is provided with a notched cutting edge 20 and is also provided with a shank 21 which is disposed through the handle 5, threaded and equipped with the nut 22.

Obviously to open the hook members b which connect the end links c, the chain is placed upon the anvil 18 and the handle 5 is brought downwardly with the wedge member 19 engaging between the ends of the hook member to spread the same apart. The link can then be again connected by new hooks by setting the link in between the handle jaws 9—10 of the handles 6—7 respectively along with the hook member and then lifting up on the handle 5 which will bring the jaws together and press the hook b into proper connecting position.

While the foregoing specification sets forth the invention in specific terms, it is to be understood that numerous changes in the shape, size and materials may be resorted to without departing from the spirit and scope of the invention as claimed hereinafter.

Having described the invention what is claimed as new is:—

A chain repairing device of the character stated comprising a base consisting of a substantially inverted U-shaped structure, a handle disposed at one end portion across the bight portion of the inverted U-shaped structure, a second handle, a pivotal link connection between the handles, an anvil block mounted on the first-mentioned handle above the bight portion of the inverted U-shaped structure, a tool carried by the second-mentioned handle in opposed relation with the said anvil block, and a U-shaped clamp member disposed over the block and first-mentioned handle and through openings in the bight portion of the inverted U-shaped structure, and nuts on the lower ends of the U-shaped clamp member adapted to be fed against the bottom side of the bight portion of the inverted U-shaped structure.

LOUIS HOFFMAN.